(12) United States Patent
Mitchell

(10) Patent No.: US 8,371,730 B2
(45) Date of Patent: Feb. 12, 2013

(54) MARINE LIGHT HOLDER

(76) Inventor: Brian J. Mitchell, Kitchener (CA)

( * ) Notice: Subject to any disclaimer, the term of this patent is extended or adjusted under 35 U.S.C. 154(b) by 180 days.

(21) Appl. No.: 13/045,833

(22) Filed: Mar. 11, 2011

(65) Prior Publication Data

US 2011/0242819 A1      Oct. 6, 2011

Related U.S. Application Data

(60) Provisional application No. 61/321,300, filed on Apr. 6, 2010.

(51) Int. Cl.
*B60Q 1/00* (2006.01)
*F21V 1/00* (2006.01)
(52) U.S. Cl. ........................ 362/477; 362/396
(58) Field of Classification Search .................. 362/396, 362/477
See application file for complete search history.

(56) References Cited

U.S. PATENT DOCUMENTS 6,802,633 B1 * 10/2004 VandenBossche ............ 362/477
D640,402 S * 6/2011 Mitchell ........................ D26/60

* cited by examiner

*Primary Examiner* — Jason Moon Han
(74) *Attorney, Agent, or Firm* — Carlson, Gaskey & Olds PC

(57) ABSTRACT

A light for use with a floating object, like a boat, has a body, the body having a flange and a light bulb extending therefrom, a lens, and a switch for activating and deactivating the bulb, the switch being disposed between the lens and the body. A mounting bracket attaches to the body and has an arm for cooperating with the flange such that the body may be disposed at varying angles relative to the arm, a first clamp attaching to the arm and a second clamp attaching to the first clamp such that the mounting bracket may be clamped to an item on the floating object.

9 Claims, 3 Drawing Sheets

MARINE LIGHT HOLDER

RELATED APPLICATION

This application claims priority to U.S. Provisional Application Ser. No. 61/321,300, which was filed on Apr. 6, 2010.

BACKGROUND OF THE INVENTION

This application relates to lighting and more particularly to lighting for use in marine applications.

Lighting is highly desirable for safely using and operating boats. Visibility to other craft is also particularly desirable. However, wiring for lighting is not necessarily desirable if the wires have to be placed through bulkheads where leaks may occur. Also, anything extra on boats requires maintenance.

SUMMARY OF THE INVENTION

According to an exemplar, a light for use with a floating object, like a boat, has a body, the body having a flange extending therefrom, a light bulb extending from the body, a lens, and a switch for activating and deactivating the bulb, the switch being disposed between the lens and the body. A mounting bracket attaches to the body and has an arm for cooperating with the flange such that the body may be disposed at varying angles relative to the arm, a first clamp attaching to the arm and a second clamp attaching to the first clamp such that the mounting bracket may be clamped to an item on the floating object These and other features of the present invention can be best understood from the following specification and drawings, the following of which is a brief description.

BRIEF DESCRIPTION OF THE DRAWINGS

FIG. 6 is a top view of an alternative embodiment of a clamp as shown in FIG. 2.

DETAILED DESCRIPTION OF THE PREFERRED EMBODIMENT

Figure 1:
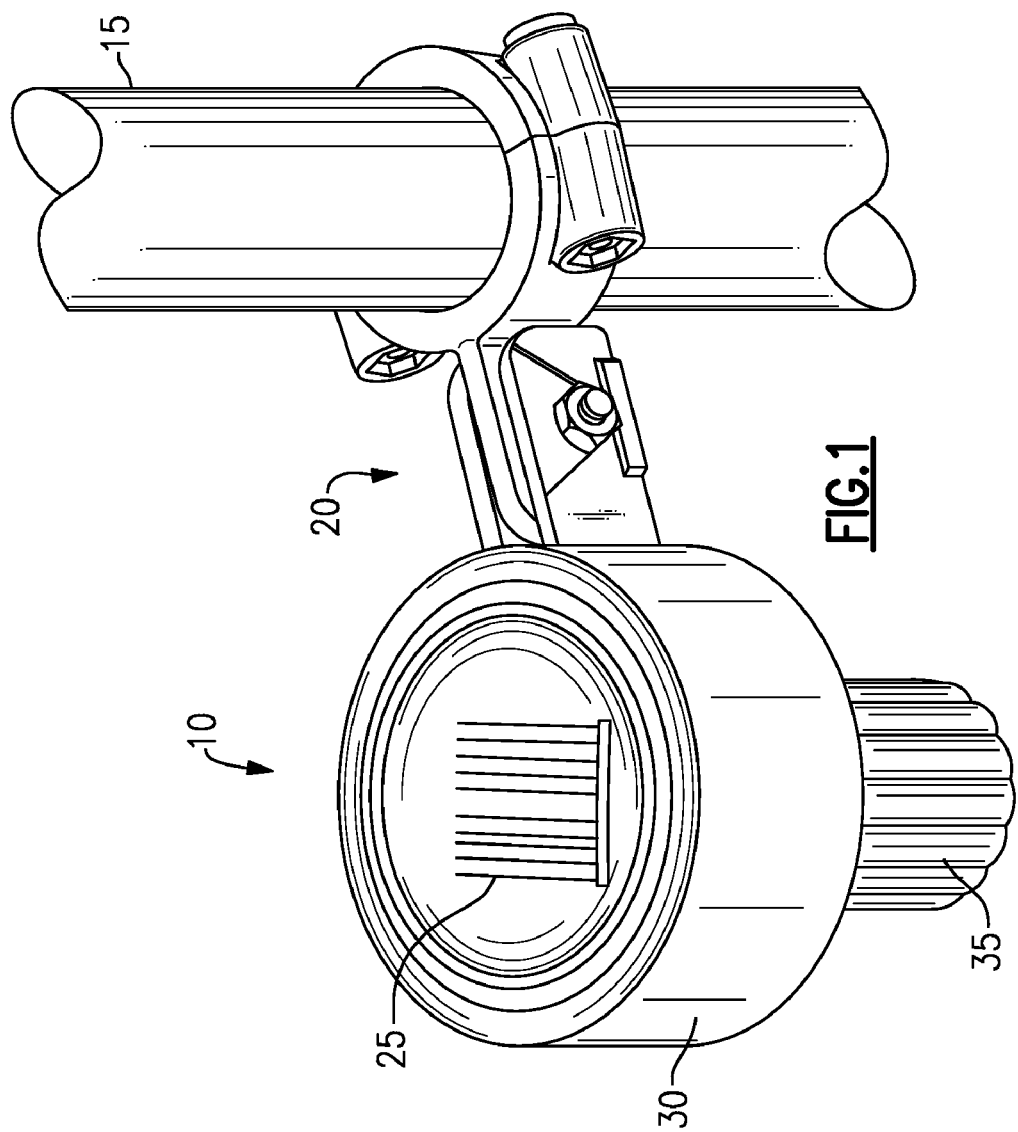
FIG. 1 is a perspective, schematic view of a light module.

Referring now to FIG. 1, a light module 10 is mounted to a post 15 by a mount 20. The light module 10 has a solar cell 25, a body 30 and a lens 35. The post 15 may also be a mast, a spar, or a railing disposed on a floating object, such as a boat, or any other circular or shaped body that may be clamped and where light may be necessary.

The body 30 contains the electronics (not shown) to store energy from the solar cell 25 and power a light source 40 (see FIG. 2), such as a bulb, an LED or the like when lighting is deemed necessary by user. The body 30 may include a battery (not shown), such as a disposable or rechargeable battery or a capacitor to store the sun's rays (not shown). The mount 20 has a first c-shaped clamp 45 and a second c-shaped clamp 50. The first clamp 45 has a semicircular section 55 with a pair of screw bodies 60 attached thereto. The second clamp half 50 has a semicircular portion 65, a pair of screw bodies 70 that mate with the screw bodies 60 of the first clamp half 45. The semicircular portions 55, 65 are slightly smaller than the diameter of the post 15 (See FIG. 1) so that when a screw 75 is tightened in the screw bodies 60, 70, the first clamp half 45 and the second clamp 50 half form a friction fit with the post 10. The mount 20 further has a first extension 80 extending horizontally from the second clamp half 50 towards the light module 10. The light module has a pair of arms 85 that enclose the first extension 80 extending from the second clamp half. The clamps 45, 50 may have different shapes and differing dimensions to attach to different mounting posts etc.

Figure 2:
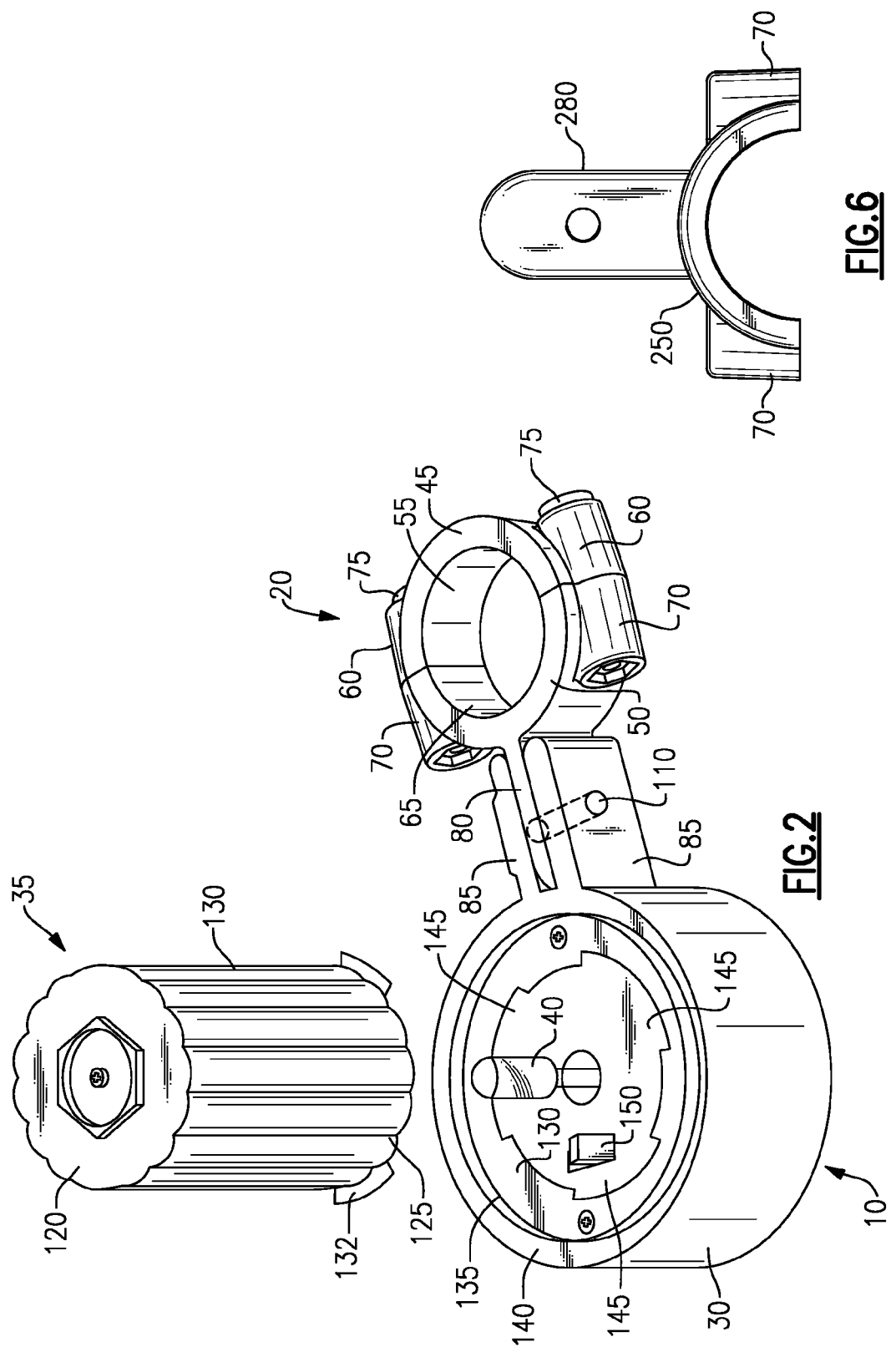
FIG. 2 is a partially disassembled perspective view of the light module of FIG. 1.
Figure 3:
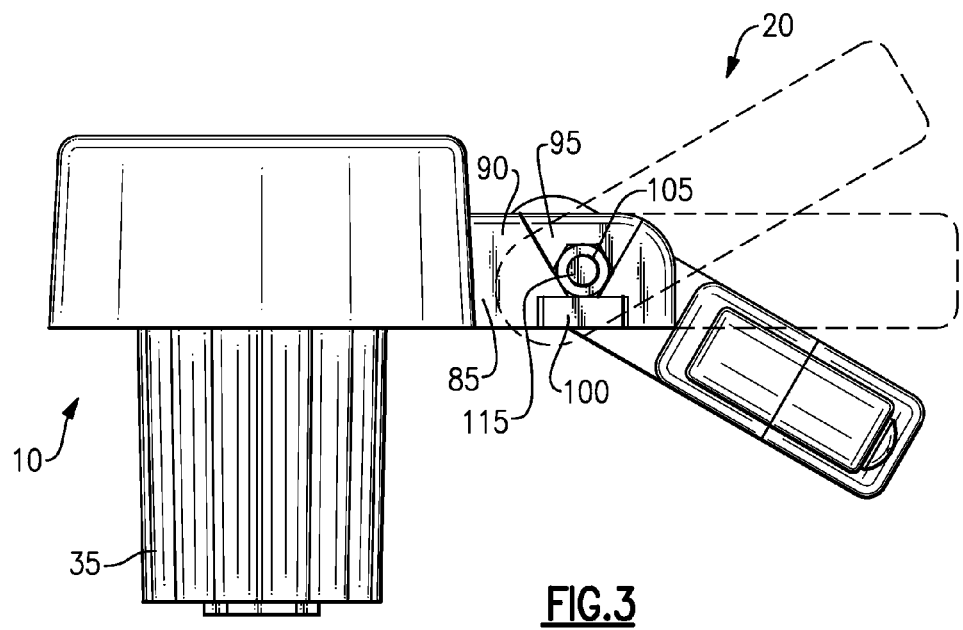
FIG. 3 is a side view of the light module of FIG. 1 shown in several positions.
Figure 4:
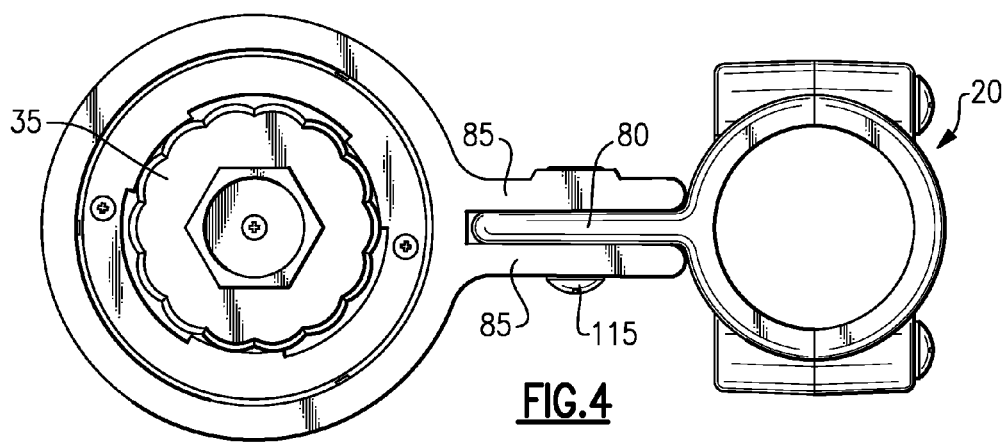
FIG. 4 is a bottom view of the light module of FIG. 1.
Figure 5:
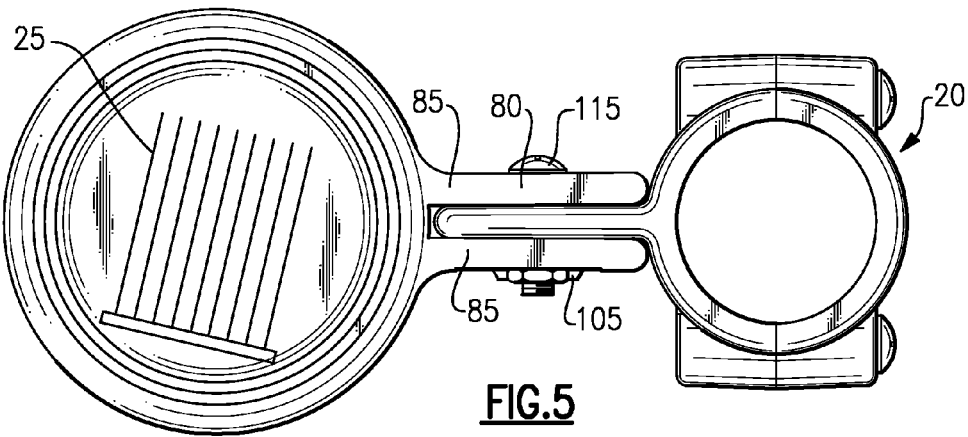
FIG. 5 is a top view of the light module of FIG. 1.

Referring now to FIG. 3, one of the arms 85 on an outer portion 90 thereof has a v-shaped indentation 95 with a bar 100 at the bottom thereof which forms a truncated v-shape to prevent the nut from rotation. The v-shaped indentation 95 and the bar 100 form half a hexagon so that a hexagonol nut 105 may be retained therein without rotation. Each of the arms and the extension have a hole 110 (see FIG. 2) therethrough through which a bolt 115 extends. In operation the bolt 115 is extended through the hole 110, the nut 105 is slid into the v-shaped indentation 95 and abuts the bar 100 so that the nut 105 will not rotate when the bolt 115 is torqued down. As the bolt is torqued down, the arms are pulled toward the extension to hold the light module at the proper desired angle as may be seen in FIG. 3. The indentation 95 is in the side of the arm 85. One of ordinary skill will recognize that the indentation 95 may mimic an outer shape of any shaped nut 105 to stop it from rotation.

Referring now to FIG. 2, the lens 35 has a roughly frustoconical shape having a narrower top 120 and a wider bottom 125 and a plurality of scalloped sides 130 that cooperate with each other to magnify the light of the lens, which may be a Fresnel or other type of lens though other shapes of the lenses are contemplated. At the bottom 125 of the lens 35 a plurality of ears 132 extend outwardly from the lens.

The body 30 of the light module 10 has an attachment bracket 133 disposed within an indentation 135 in the top 140 of the light module. The attachment bracket 133 has openings 145 which cooperate with ears 132 of the lens 35. In operation, the ears 132 of lens 35 are disposed within the openings 145 of the bracket and then the lens 35 is rotated to secure the ears 132 under the attachment bracket 133. The lens 35 encloses a bulb 40, such as an LED or other light source, and a switch 150. The switch 150 is disposed within the lens 35 to protect it and the electronics it controls from the elements.

Referring to FIG. 6, a further embodiment of clamp 50 of FIG. 2 is shown. Clamp 250, which mates with clamp 45 to grip post 15, and has a second extension 280 that extends vertically from the clamp 250. The pair of arms 85 enclose the second extension 280 as with the first extension described herein infra. The light module 10 may then be disposed horizontally from a post 15.

Because the light module 10 and the mount 20 are very portable, they can be placed any where a round post or mast or railing exists. The lights may provide lighting for burned out lights or the like, provide light where needed for reading or the like, or to comply with local requirements.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from the essence of this disclosure. The scope of legal protection given to this disclosure can only be determined by studying the following claims.

What is claimed is:

1. A light for use with a floating object on water, said light comprising:
   a body, said body having a first surface, a second surface, a pair of parallel flanges and a light source extending from said first surface,
   a switch for activating and deactivating said bulb extending from said first surface,
   an attachment bracket attaching to said first surface wherein said attachment bracket does not interfere with access to said switch,
   a lens removeably attaching to said body via said attachment bracket, said lens encapsulating said light source and said switch,
   a mounting bracket attaching to said body, said mounting bracket having:
      an arm disposed between said parallel flanges,
      a bolt extending through said parallel flanges and said arm,
      a nut engaging said bolt,
      a truncated v-shaped groove for holding said nut against rotation, said groove disposed in one of said parallel flanges wherein said parallel flanges frictionally engage said arms by tightening said bolt in said nut wherein said body may be disposed at varying angles relative to said arm,
      a first shaped clamp attaching to said arm, and
      a second shaped clamp attaching to said first shaped clamp such that said mounting bracket may be attached to an object on said floating object.

2. The light of claim 1 wherein said light source is an LED.

3. The light of claim 1 wherein each of said shaped clamps has an interference fit with said object.

4. The light of claim 1 wherein said lens has ears that cooperate with openings in said attachment bracket.

5. The light of claim 1 wherein said first clamp and said second clamp are c-shaped.

6. The light of claim 1 wherein said arm is disposed horizontally.

7. The light of claim 1 wherein said arm is disposed vertically.

8. A light for use with a floating object on water, said light comprising:
   a body, said body having a first surface, a second surface, a pair of parallel flanges and a light source extending from said first surface,
   a switch for activating and deactivating said bulb extending from said first surface,
   an attachment bracket attaching to said first surface wherein said attachment bracket does not interfere with access to said switch,
   a lens removably attaching to said body via said attachment bracket, said lens encapsulating said light source and said switch,
   a mounting bracket attaching to said body, said mounting bracket having an arm disposed between said parallel flanges wherein said flanges frictionally engage said arm such that said body may be disposed at varying angles relative to said arm, a first c-shaped clamp attaching to said arm and a second c-shaped clamp attaching to said first c-shaped clamp such that said mounting bracket may be attached to an object on said floating object.

9. The light of claim 8 further comprising a bolt extending through said parallel flanges and said arm and
   a nut engaging said bolt and a truncated v-shaped groove disposed in one of said parallel flanges for holding said nut against rotation wherein said parallel flanges frictionally engage said arms by tightening said bolt in said nut.

* * * * *